Fig. 1.

Inventor
ROBERT BUCKLEY

Fig. 2

Inventor
ROBERT BUCKLEY

United States Patent Office 3,525,592
Patented Aug. 25, 1970

3,525,592
SAMPLING AND DILUTING APPARATUS
Robert Buckley, Abingdon, England, assignor to Quickfit & Quartz Limited, Walton, Stone, England, a corporation of Great Britain
Filed Sept. 13, 1967, Ser. No. 667,388
Claims priority, application Great Britain, Sept. 13, 1966, 40,850/66
Int. Cl. G01n 1/14
U.S. Cl. 23—253
7 Claims

ABSTRACT OF THE DISCLOSURE

A liquid sampling device for continuously taking measured samples of blood in succession and diluting them with measured quantities of deterent liquid comprises a liquid sampling device for continuously taking measured samples of liquid in succession and diluting them with measured quantities of diluent liquid, said apparatus comprising a probe, a first syringe, the cylinder of which is connected to the probe by a closed conduit, a second syringe the cylinder of which is connected by a second closed conduit to a liquid diluent container, a third closed conduit connecting said second conduit to said first conduit, a two-way valve between said second and third conduits, and means for actuating the syringes and the valve in timed relation whereby the first syringe actuates to draw a measured volume of a sample of liquid into the probe and to eject it therefrom and the second syringe ejects a measured volume of diluent from the container through the probe behind the ejected liquid sample. Two or more sampling devices may be used mounted on a frame with a liquid specimen container carrier movably mounted on the frame with two rotating turntables, a first sampling device (which may be duplicated) extracting samples and diluting them and returning them to containers on the first turntable, a separator for separating the samples into two fractions one of which is returned to containers on a turntable and a sampling device extracting a measured quantity of separated fraction from the last named turntable and delivering it to a use position.

BACKGROUND OF THE INVENTION

Field of the invention

This invention relates to apparatus for automatically preparing samples for analysis, such as is used for sampling small volumes of liquid, e.g., 0.1 to 0.6 mil. for various purposes such as in testing laboratories for analysis of, for example, blood, blood serum, cerebrospinal fluid or urine.

Description of the prior art

In medical analysis of blood, a sample of predetermined volume is always taken from a specimen of the patient's blood and this is diluted with a suitable liquid which may be reactant; the diluted blood is then treated as in a centrifugal or other separating apparatus to remove the red corpuscles and the protein and the supernatant liquor is passed to a testing point; the liquor may be diluted with a further diluent liquid, which may be a reactant, before being tested.

Modern blood and similar testing laboratories have to handle large numbers of blood samples in a given period of time and it is therefore necessary to provide a sampling apparatus which will handle samples continuously in rapid succession to provide accurately measured equal volumes of the samples at the testing point. Known apparatus for this purpose comprises a probe for insertion with a container of the sample of blood taken from a patient in a hospital or surgery, a pump for withdrawing a measured quantity of the blood through the probe and subsequently depositing in a container for dilution, and a supply of liquid for flushing the apparatus before it is used to handle the blood of the next succeeding sample. In such known apparatus the probe is flushed with a diluent which is moved by the pump from a reservoir into a pipe connected to the pump and probe so that the diluent is forced by the pump behind the sample of blood in the probe as the sample is ejected from the probe thereby flushing the probe and in some cases a measured quantity of diluent is ejected from the probe for mixing with the blood sample.

The main object of the present invention is to provide an improved blood or other liquid sampling apparatus which may be associated with a diluted sample separator and, if desired, a supernatant liquid diluting apparatus so that samples are provided in rapid succession at a delivery point such as a laboratory or sample store.

SUMMARY

According to the present invention a liquid sampling device is provided for continuously taking measured samples of blood in succession and diluting them with measured quantities of deterent liquid comprising a liquid sampling device for continuously taking measured samples of liquid in succession and diluting them with measured quantities of diluent liquid, said apparatus comprising a probe, a first syringe, the cylinder of which is connected to the probe by a closed conduit, a second syringe the cylinder of which is connected by a second closed conduit to a liquid diluent container, a third closed conduit connecting said second conduit to said first conduit, a two-way valve between said second and third conduits, and means for actuating the syringes and the valve in timed relation whereby the first syringe actuates to draw a measured volume of a sample of liquid into the probe and to eject it therefrom and the second syringe ejects a measured volume of diluent from the container through the probe behind the ejected liquid sample.

In one preferred construction each syringe is operatively connected to an actuating device and the valve is connected to an actuating device, the actuating devices being connected to a source of power which energises said devices in timed sequence.

Preferably the piston of each syringe and a valve actuating rod or the like are connected to one or more fluid pressure or vacuum actuating devices and means are provided to apply pressure of vacuum respectively to the syringe and the valve in a predetermined sequence.

From another aspect of the invention an apparatus is provided for continuously taking measured samples of liquid in succession, diluting them with measured quantities of diluent and presenting the prepared samples at a further use station, said apparatus comprising a frame, at least two sampling devices of this invention mounted in the frame, a carrier movably mounted in the frame for supporting liquid specimen receptacles and moving them in succession past operating stations, a first sampling device for extracting a measured sample from each specimen and delivering it with a measured quantity of diluent to a separator which separates it into at least two fractions and delivers one separated fraction to a receptacle on a moving carrier, a second sampling device for extracting a measured quantity of the separated fraction from a receptacle on said carrier and delivering said fraction with a measured quantity of diluent into a receptacle on a moving carrier, and a pick-up device for extracting a quantity of diluted fraction from its receptacle and delivering it to a further use station, the sampling devices, carriers, syringe and pick-up device being operated in timed sequence.

In a preferred apparatus the carriers comprise two turntables each having a plurality of equispaced receptacle receiving means and located so that as they rotate the receiving means pass the operating stations in succession, the probes being movable into and out of alternate specimen receptacles on the first turntable and delivering into a receptacle which may be a separating device, the second turntable having receptacle receiving means, and the second sampling means extracting a separated fraction from alternate receptacles in said last named means and delivering diluted fraction into the alternate receptacles in said lower turntable.

BRIEF DESCRIPTION OF THE DRAWINGS

In order that this invention may be more fully understood, one embodiment in accordance therewith will now be described by way of example with reference to the accompanying drawings in which.

In the drawings the same references are used to designate the same parts.

DESCRIPTION OF THE PREFERRED EMBODIMENT

Figure 1:
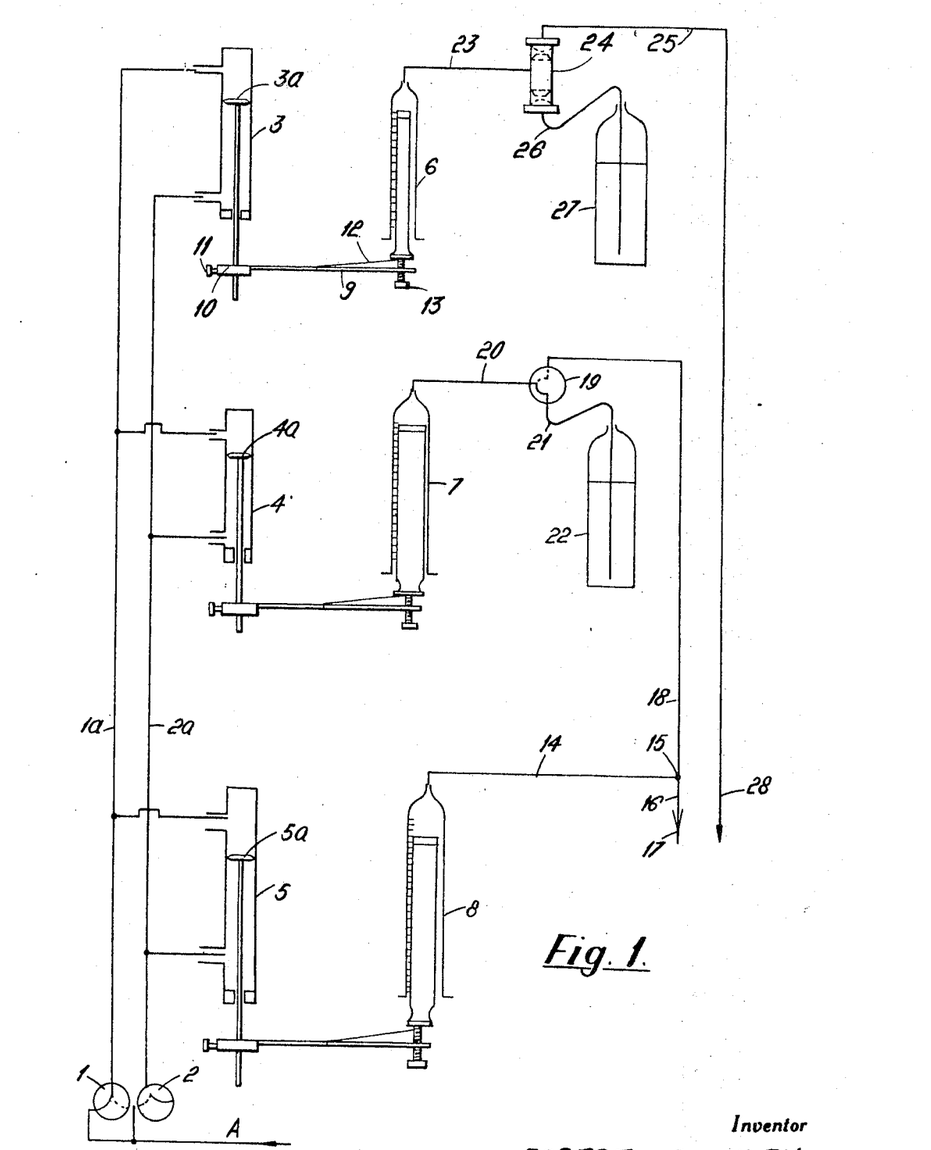
FIG. 1 is a line diagram of sampling device.

Referring to FIG. 1, the sampling device has a compressed air supply line A which supplies two valves 1, 2, connected by pipes 1a and 2a respectively to chambers on opposite sides of pistons 3a, 4a, 5a, in each of three operating cylinders 3, 4, 5 so that the valves may be operated to move the pistons up or down. The supply A may be a reduced pressure device to draw the pistons up or down in their cylinders if desired, so that these comprise double acting pumps.

The rod of each piston 3a, 4a and 5a extends out of its cylinder through a suitable stuffing box or the like of conventional construction (not shown) and is connected to the rod of a piston sliding in a cylinder of a syringe 6, 7, 8 respectively. The connection between each rod 3a, 4a, 5a to its syringe rod is a sliding arm 9 one end of which is secured by a collar 10 to the pump piston rod and is provided with a clamping screw 11 whereby the collar may be roughly adjusted to any desired position along the rod. The other end of the arm 9 is secured to the end of the syringe rod through a spring clip 12, a fine adjustment screw 13 being provided to vary the distance between the end of the clip 12 and the end of the syringe rod.

The syringe cylinders are calibrated, e.g. in mm.$^3$ or cm.$^3$, so that by regulating the position of the arm 9 on the pump and syringe rods, the syringes can each be adjusted to draw in and out accurate predetermined volumes of liquid as will be described. The top of the syringe 8 is connected by a closed conduit or pipe 14 to a T-junction 15 connected by a closed conduit or pipe 16 to a probe 17 and by a closed conduit or pipe 18 to a two-way valve 19 in turn connected by closed conduits or pipes 20, 21 to the syringe 7 and a diluent container 22 respectively.

In the simplest form of the device only the syringes 7, 8 are employed, the syringe being not used or kept idle by a shut-off valve in the compressed air pipes to its cylinder. In operation, with the syringes 7, 8 in the positions shown in FIG. 1, the cycle starts by placing a sample of liquid, e.g. blood, in contact with the probe and the valves 1, 2 are operated to cause the pump pistons to move downwardly thereby moving the syringe pistons also downwardly. The syringe 7 fills with diluent from the container 22 through the valve 19 and the syringe 8, which with the pipes 14, 16 is full of the diluent, draws blood into the probe and, may be, partly into the pipe 16, but the lengths and cross-sections of the pipes 14, 16 are selected so that blood does not reach the T-junction 15. The probe and sample receptacle are then moved relatively so that the mouth of the probe is brought into a collecting device (not shown). The valves 1, 2 are then moved to the opposite position so that the pump pistons move upwardly moving the syringe pistons up with them and blood is forced out of the probe by the syringe 8; the valve 19 is then moved to connect the syringe 7 to the pipe 18 and the syringes 7, 8 are thereafter actuated so that the diluent flows down the pipe 16 behind the blood into the collecting device. The adjustment of the syringes 7, 8 is effected so that a predetermined volume of blood is collected from the sample and discharged from the probe and a predetermined volume of diluent is then ejected through the probe, the force of delivery from the probe being such to ensure good mixing of the blood and diluent in the collecting device, which is normally a receptacle but may be a duct leading to another part of the apparatus in which the mixing takes place.

The probe is made of hydrophobic material to minimise drop formation in the probe and at its mouthpiece. The valve 19 may be rotary, as shown, or of any other suitable form. The syringes or at least their cylinders may be made of glass or transparent plastic material. The diluent also serves to flush any residual blood out of the probe.

When the pump 3 and syringe 6 are used, these are operated with the pumps 7, 8. The top end of the cylinder of syringe 6 is connected by a pipe 23 to a double acting valve 24 having upper and lower pipes 25, 26 connected to a diluent receptacle 27 and to a spout 28 so that when the pumps 7, 8 deliver blood and diluent through the probe, the diluent from the receptacle 27 is ejected through the spout 28.

Figure 2:
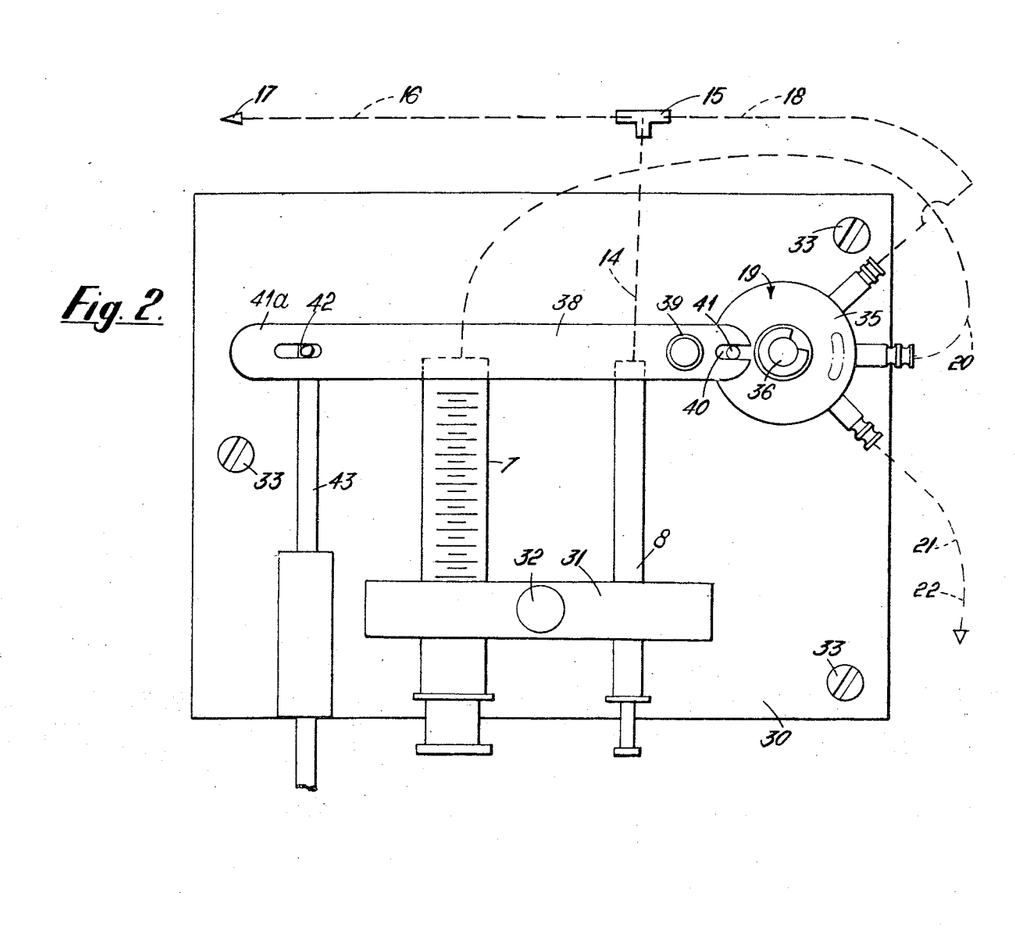
FIG. 2 is a front view of a sampling device.
Figure 3:
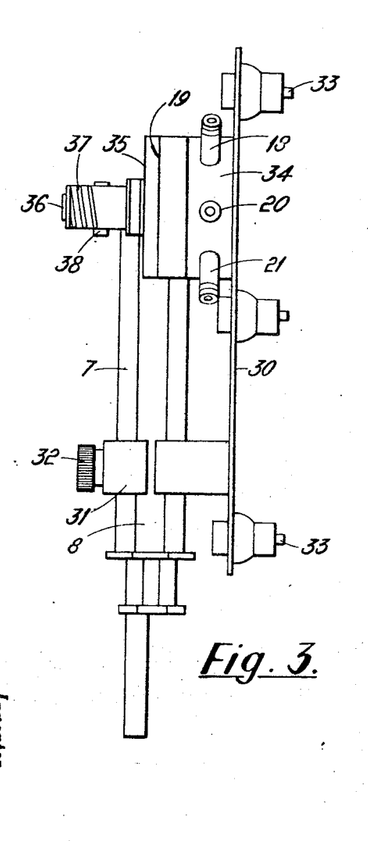
FIG. 3 is a side view of the device in FIG. 2.

Referring to FIGS. 2 and 3 these show a sampling device using the syringes 7, 8 of FIG. 1, the probe 17 and reservoir 22 being indicated by arrows and the pipes 14, 16, 18, 20, 21 as well as the T-junction 15 and the valve 19 are shown. The syringes 7, 8 are mounted on a frame or plate 30 by a clamping strip 31 held on the plate by a screw 32 which can be tightened or loosened by hand. The plate 30 has screws 33 by which it can be easily mounted on and removed from a support.

The valve 19 has a body 34 fixed to the plate 30 with connectors for the pipes 18, 20, 21 and a rotary member 35 is pivoted on a pin 36 fast with the body. A spring 37 on the pin causes frictional engagement of the member 35 but permits it to be rotated on this pin. An arm 38 is pivoted by a screw 39 fixed to the plate 30 and has a short arm with a slot 40 engaging a pin 41 on the member 35, and a long arm 41a engaged through a pin and slot connection 42 by a rod 43 actuated by a pump 44 (FIGS. 4 and 5).

The pistons of the syringes 7, 8 are each connected to piston rods of pumps 4, 5. The pumps 4, 5 and 44 are connected by pipes indicated at 46 to valves 1, 2 in turn connected to a compressor or vacuum device 47 driven by a prime mover such as an electric motor (not shown).

Figure 4:
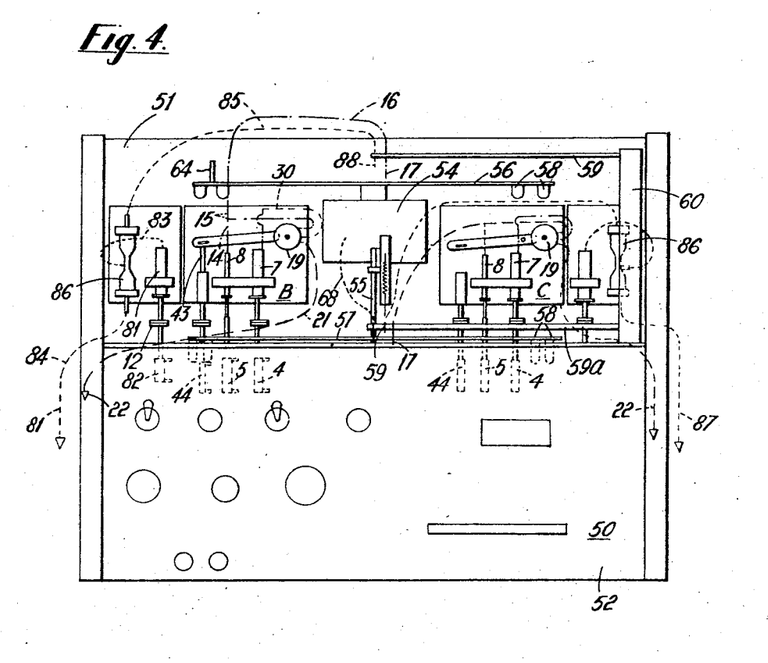
FIG. 4 is a partial front elevation of a sampling apparatus incorporating two sampling devices similar to FIGS. 2 and 3.
Figure 5:
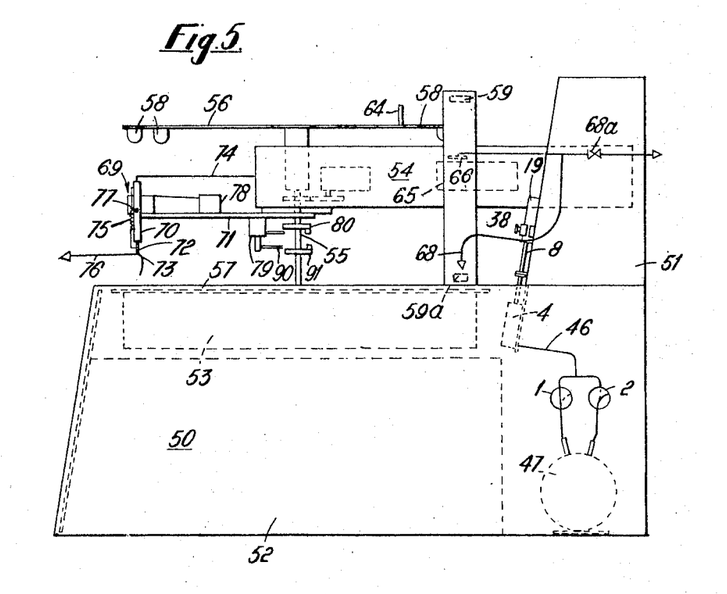
FIG. 5 is a partial side view of the apparatus of FIG. 4.
Figure 6:
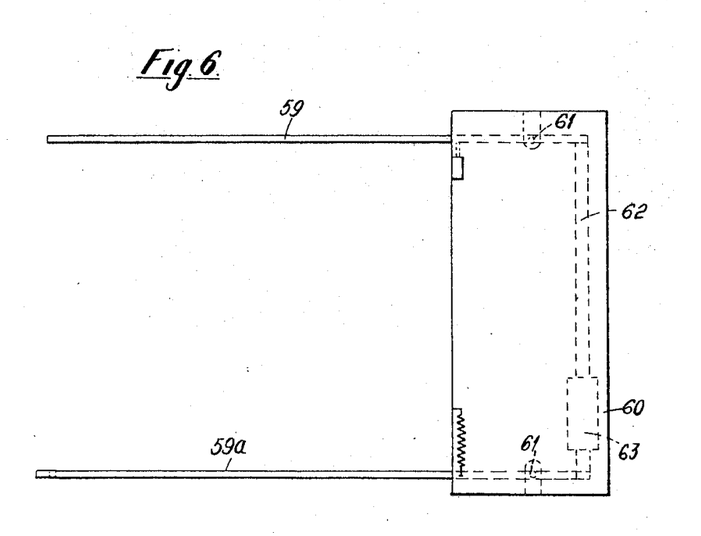
FIG. 6 is a side view of the probe supporting arms and their operating means.

In FIGS. 4 to 6, the apparatus shown has two devices B, C, each as described with reference to FIGS. 2 and 3. The apparatus has a frame 50 on which the devices are supported one on either side, but one or more additional such devices may be employed if desired for the addition of other liquids to the samples as will be described.

The back 51 of the frame riser above the base 52 which has an open topped bath 53 to be filled with warm liquid, e.g., water and this may be maintained at an even temperature by a thermostatically controlled heating unit which may be heated by conventional electric filaments.

A supporting bracket 54 extends from the back 51 over the bath and supports a rotary shaft 55 driven by a suitable drive, e.g., a chain from a prime mover, e.g., an electric motor (not shown), in the bracket 54 or in the frame. The shaft has fixed to its upper and lower turntables 56, 57 having two rings of holes 58 to receive receptacles for blood to be sampled and supernatant liquor.

The upper turntable 56 is operated with sample receptacles in alternate holes in each ring, the other holes being left empty. The lower turntable has collection receptacles and reaction receptacles in alternate holes in each ring, the reaction receptacles being longer than the collection so that the longer receptacles dip into the bath. The receptacles are all open topped resembling short test tubes and are preferably of plastics material. The two turntables are arranged so that the sample receptacles are vertically above the collection receptacles and the blank holes in the upper turntables are above the reaction receptacles.

At the side of the frame two probe arms 59, 59a are pivoted at 61 on a rotating tower 60 on the frame. Each arm is connected to the rod 62 of a prime mover 63, e.g., a solenoid, which moves the probes vertically into and out of the receptacles and blank holes 58 in timed relation with the turntables. A pin 64 on the turntable 56 between the two circles of holes 58 engages a cam face on the upper probe arm when the last sample in the inner ring of receptacles in table 56 has been discharged to the separator and swivels the arms with the tower so that the probes then register with the outer ring of turntable holes. After the outer ring of receptacles has been discharged the probe arms are swivelled back to the inner row of holes manually.

The position of the tower is so fixed that the probes can only operate at fixed points, namely when the upper probe is directly above a separator 65 mounted in the bracket 54, the size of the separator being such that the upper probe can discharge directly into it through blank holes in the upper turntable.

The separator 65 is preferably a rotating disc centrifuge with a traversing scoop 66, the disc being rotated by a prime mover, e.g., an electric motor, (not shown) so that the disc spins at sufficient speed to separate the supernatant liquor and red corpuscles and protein in the blood into different layers. The scoop driven by a motor (not shown) traverses the disc and draws off the liquor and transfers it to one of the collecting vessels on the lower turntable, through a pipe 68 carried by the lower probe arm. At a predetermined instant in the traverse of the scoop a valve 68a is opened (by means not shown) actuated from the scoop prime mover so that the waste matter in the centrifuge, i.e., red corpuscles and protein are drawn off through the scoop to waste by a vacuum through a pipe. Means may be included for injecting cleaning liquid e.g. water into the centrifuge to wash it out as desired.

A take-off system 69 is mounted above the lower turntable and can be rotated about the shaft 55 between approximately 45° and 315° as seen from above the turntables with the probe position taken as 0°. The system 69 has a cylinder 70 mounted at the outer end of an arm 71 pivoted on the shaft 55, the lower end of the cylinder rod 72 carrying a pipe holding device 73; the cylinder piston is forced down by compressed air supplied through a pipe 74 and is raised by a spring 75 when the air pressure is disconnected. When the device 73 is lowered the end of the pipe 76 dips into a reaction receptacle and its contents are drawn off by vacuum to a storage vessel or to an analytical apparatus which forms no part of this invention. The cylinder 70 is pivoted at 77 to the arm 71 and is moved by a solenoid 78 on the arm 71 to bring the pipe 76 into register with receptacles in the outer or inner ring of holes 58 in the lower turntable 57. The solenoid is energised through an electric circuit which includes a microswitch 79 on the arm 71 actuated by a cam 80 fast on the shaft 55.

As the pipe lines shown in FIG. 4 indicate the device B operates through the upper probe while the device C operates with the lower probe. Each device B, C has a third syringe 81 also actuated by a pump 82 through valves connected to the compressor and is connected through pipes 83, 84, 85 and a valve 86 to a reagent reservoir 87 and a nozzle 88 connected to the probe arm adjacent to the probe.

The apparatus has two diluting and dispensing devices substantially as shown in FIG. 1 each utilising three syringes. Two syringes are coupled through a pneumatically operated valve to form a diluting apparatus. The third is used with a double one-way valve system to form a dispensing apparatus. These devices are mounted on the back of the frame, the base of which has the open topped bath. The supporting bracket supports the rotary shaft 55 which is driven by a motor mounted in the support bracket and the upper and lower turntables are fixed to the shaft. The turntable has sample containers in its alternate holes, the other holes are left empty. The lower turntable has collection vessels and reaction vessels in alternate holes, the reaction vessels being longer so that they dip in the water bath. The two turntables are arranged so that the sample vessels are vertically above the collection vessels and the blank holes vertically above the reaction vessels.

At the side of the frame the two probe arms are mounted on a swivelling tower, one arm serving the upper table and the other the lower. The dipping of the arms is controlled by the solenoid 63 which operates both at the same time. The arms are moved from the inner to outer ring of vessels by the pin 64 mounted on the turntable and the tower swivels to provide this movement. The position of the tower is fixed so that the probes can only operate at a fixed point. This point is such that the upper probe is directly above the separator which is mounted in the support bracket. The size of the separator is such that the probe can discharge directly into it from the inner or the outer ring of the table.

The take-off system 70 is mounted above the lower turntable and can be rotated about the main shaft between approximately 45° and 315°, the probe position being taken as 0°. Application of air pressure forces the pipe 76 down into a reaction vessel and allows an external instrument to withdraw the contents of the vessel. This syringe is moved into line with the inner or outer ring of vessels by the solenoid 78.

The separator 65 is a rotating disc centrifuge fitted with a traversing scoop which draws off the supernatant liquor and transfers it directly to one of the collection vessels in the lower table via the pipe 68 carried by the lower probe arm. At the preset point in the traverse of the scoop the valve 68a is opened so that the waste matter in the centrifuge can be drawn off by vacuum to waste. Facilities are included for injecting water into the centrifuge for cleaning.

The operation of the apparatus is as follows:

All pumps 4, 5, 45, 82 are primed and blood samples in receptacles are loaded into the holes in the upper table 56. As sample number one comes into line with the upper probe 17 this is dipped by the solenoid 63 and a sample taken. The lower probe also dips but its associated syringes are inoperative at this time. When the first blank hole in the upper turntable comes into line with the probe, the upper probe 17 is dipped and the sample is discharged directly into the centrifuge 65. The sample is washed out by the diluent from the reservoir 22 and a second reagent is added if required by the pump 86 and pipe 88. The centrifuge is started on its cycle which is arranged so that the supernatant liquor is discharged to the first collection vessel in table 57 just before sample number two comes into line with the probe on the top table 56. Thus sample two and the supernatant liquor from sample one come into line with the probes at the same time. At this time both the probes are dipped and samples are taken into the pipes. At the same time, water is injected into the centrifuge to wash it. The syringes associated with the lower probe are now operative. When the second blank hole in table 56 and first reaction vessel in table 57 come into line with the probes, the syringes are discharged. A second reagent, if required is added to the mixture in the reaction vessel by the dispenser unit 89 associated with the lower probe. Thus vessels in the lower table are two steps behind vessels in the upper table. The sampling, diluting and separating process is continued for succeeding samples. The movement around the table of the reaction vessels acts as an incubation period. The duration of this period is set by the position of the take-off arm 71, the cylinder 70 being inoperative until the first reaction vessel comes into line with it. At this point, the cam 80 on the drive shaft operates the microswitch 79 mounted on the rotating take-off arm 71. This opens a valve in the air line to the cylinder 70. Air is passed along this line 74 at the time of sampling by the upper and lower probes so the take-off pipe 76 is inserted at this time. Return is by spring 75. The take-off cylinder is inactive during the discharge cycle and so only intercepts reaction vessels. When the take-off pipe is inserted in the reaction vessel, a signal is sent by a suitable device (not shown) to a separate measuring instrument. This separate instrument then applies suction and withdraws the reaction mixture from pipe 76.

When the inner ring of samples on each turntable has all been taken, the upper probe is moved to the outer ring by the pin 64 fixed to the upper table. The lower probe is moved in a similar manner at the same time which is two steps later than the upper turntable. When the cam 80 actuates the microswitch 71 on the second revolution, the take-off solenoid 78 moves the take-off cylinder 70 from the inner to the outer ring of vessels. This coincides with the coming into position of the first reaction vessel of the outer ring.

Preferably when the last sample has been taken, the diluter and dispenser units will be switched out automatically, leaving only the take-off system and rotation active. When all samples have passed the take-off point, the whole instrument will be switched off automatically by a suitable electrical circuiting which forms no part of the present invention. Preferably a second microswitch 90 is carried on the arm 71 which is engaged by a cam 91 on the shaft 55 after the last treated sample has been removed to switch the electric circuiting to a quiescent state, a push button being provided on the control panel to restore the whole apparatus to full operation for another series of samples.

By means of the apparatus of the invention accurately measured samples of liquids may be diluted with an accurately measured aliquot of a diluent, and diluted samples can be mixed with measured quantities of other reagents in the separator if desired. The mixtures can be held at a substantially constant temperature for a predetermined period to allow a controlled reaction to take place and then the resultant reacted mixture can be removed to a further station. Any number of dispensing units 86 may be included to add further reagents as desired.

The syringes, valve 19 and all associated pipe work are mounted on the plate 30 as shown in FIG. 2. The syringes and the valve actuating rods 43 are attached to the pump rods only by spring clips 12 so that the whole liquid handling unit can be removed from the pneumatic actuation unit by releasing the three screws 33 and releasing the spring clips. This is desirable as each reagent required has its own set of syringes and valve. This obviates the tedious and time consuming task of draining, rinsing and re-filling the dilutor whenever reagents have to be changed. It also prevents cross-contamination of reagents. A further advantage is that only one actuating unit is required for use with a wide range of liquid handling units.

The instrument carries out all the analytical procedures, save that of the final measuring step, required for routine clinical tests. As an example, the following outline describes the procedure adopted for the determination of glucose in blood. The sample used is whole blood. Reagent No. 1 contained in diluent reservoir 87 is a solution of sodium hydroxide. Reagent No. 2, contained in a reagent reservoir 87 (to the right in FIG. 4) is a solution of zinc sulphate.

A sample of blood is taken, diluted with sodium hydroxide and transferred to the separator. Here the zinc sulphate is added and reaction takes place converting the blood proteins to an insoluble precipitate. This precipitate and the red blood cells are separated by centrifuging from the supernatant liquor which contains glucose (now freed from interfering substances). This is transferred to a collection receptacle on the lower table. Reagent No. 3 contained in diluent reservoir 22 is a coupled enzyme system in a suitable buffer solution. A sample of the supernatant liquor is diluted with reagent No. 3 and transferred to a reaction vessel. This dips in the water bath which is set as 37° C. (the optimum temperature for enzyme reactions). It is held at this temperature for a time set by the position of the take-off arm to allow reaction to take place. The reaction is as follows. The enzyme "glucose oxidase" breaks down the glucose present in the supernatant liquor (isolated from sample No. 1). This produces hydrogen peroxide which is in turn broken down by the enzyme "peroxidase" to produce oxygen. This oxygen reacts with an oxygen acceptor to produce a coloured compound, the two enzymes and the oxygen acceptor all being provided in reagent No. 3. Thus the intensity of the colour produced is directly related to the concentration of glucose in the initial sample. The intensity of the colour is then measured in a separate measuring device.

Figure 7:
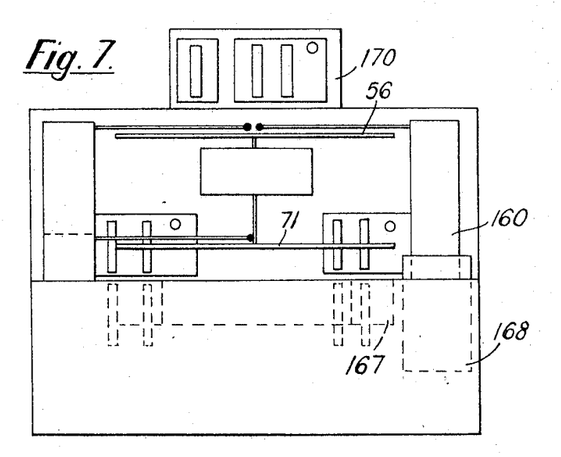
FIG. 7 is a plan view of an alternative apparatus.
Figure 8:
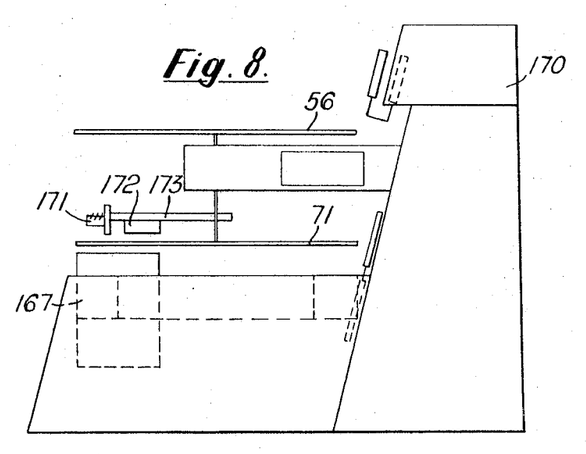
FIG. 8 is a front elevation in the apparatus in FIG. 7.
Figure 9:
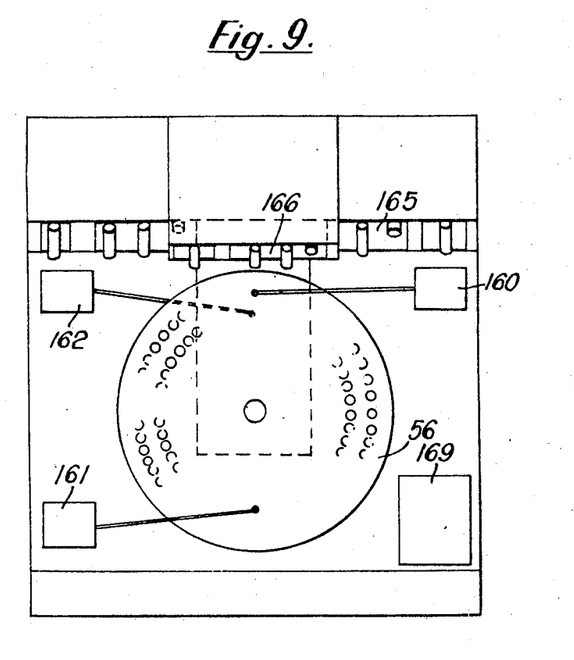
FIG. 9 is a side view of the apparatus looking from the right in FIGS. 7 and 8.

Referring to FIGS. 7 to 9 this shows an alternative construction employing a larger number and position of probe arms and their associated towers 160 and diluting and dispensing devices. Tower 161 is associated with diluter etc. 4. Similarly tower 160 is associated with diluter 165 and tower 162 is assocated with diluter 166.

The open topped bath 53 is replaced by an open topped circular trough 167. This is connected to a reservoir tank 168 which carries a combined heater/pump unit 169. This pump forces water around the trough and the built-in heater keeps it at a constant temperature.

The third set of diluters and dispensers made necessary by the addition of a third probe arm is carried on an extension 170 to the main frame work above and to the rear of the supporting bracket which carries the two turntables 56 and 71.

The take-off system has been changed to give a more positive transfer between inner and outer rows of vessels in the lower turntable. Instead of pivoting about an axis, the take-off syringe is held above the outer row of vessels until a spring 171 is released by operation of a solenoid 172. The syringe is then forced along the rotating arm 173 to a stop above the inner row of vessels. The number of holes in each turntable has been reduced to 96 arranged in two circular rows of 48.

Three types of vessel are carried by the turntables.

|  | Capacity about, ml. |
|---|---|
| Size a | 0.5 |
| Size b | 2.5 |
| Size c | 7.5 |

The upper table is loaded with size a and size b vessels in consecutive holes, the third hole being left blank. This loading uses 32 vessels of size a and size b; and leaves 32 blank holes. Similarly, the lower table is loaded with size $b$ and size $c$ vessels in consecutive holes, the third hole being left blank. The two tables are interlocked so that the blank holes in the upper table are directly above the $c$ size vessels in the lower table.

The operation of this apparatus is as follows:

All pumps or syringes are primed and the turntables loaded with vessels of the correct size and in the correct order. The turntable is rotated to its start position and locked onto the drive shaft. All the probes and probe arms are set to their start positions. Probe 1 is above the outer row of vessels, just before the first size $a$ vessel. Probes 2 and 3 are set just off the edge of the turntables. Samples are loaded into the size $a$ vessels and all other vessels are left empty. The programme control unit is set to start position and operation started.

Rotation of the turntables commences and as the first sample (in size $a$ vessel No. 1) comes into position below probe 1, the probe is dipped and a sample taken into it. No other probes or their associated equipment are operative at this time. The probe is lifted and held until size $b$ vessel No. 1 comes into position below it. The probe then dips and discharges the sample and a diluent into the $b$ vessel. The probe does not operate when the blank hole passes below it; its next operation starts when the sample in size $a$ vessel No. 2 comes into position below it. The above cycle of operations is then repeated. This continues until all samples have been processed and probe 1 is then switched out of operation by the programme control unit.

Shortly before size $a$ vessel No. 9 comes into position below probe 1, a pin on the turntable acts on a cam surface fixed to probe arm 2 to bring probe 2 into position above the outer row of vessels. As size $a$ vessel No. 9 comes into position below probe 1, side $b$ vessel No. 1 comes into position below probe 2. Probe 2 and its associated equipment is brought into operation at this time by the programme control unit. As probe 1 takes a sample of the contents of size $a$ vessel No. 9, probe 2 takes an aliquot of the contents of size $b$ vessel No. 1. This, of course, contains a measured quantity of the sample contained in size $a$ vessel No. 1 plus a measured quantity of diluent and possibly another reagent as described with reference to FIGS. 1 to 6. This aliquot from size $b$ vessel No. 1 is then discharged through the blank hole into the centrifugal separator mounted in the supporting bracket and the centrifugal separator started on its separating cycle.

Shortly before size $a$ vessel No. 10 comes into position below probe 1 and before the supernate from the centrifuge is discharged, a pin on the lower turntable acts on a cam surface fixed to probe arm 3 to bring probe 3 into position above the outer row of vessels. The supernate from the centrifuge is then collected in size $b$ vessel No. 1L (i.e. No. 1 on the lower table). Probe 3 is brought into operation at this time by the programme control unit.

At the same time as probe 1 is dipped into size $a$ vessel No. 10 and probe 2 is dipped into size $b$ vessel No. 2, probe 3 is dipped into size $b$ vessel No. 1L and an aliquot taken. Size $b$ vessel No. 1L contains a treated portion of the material contained in size $a$ vessel No. 1 which is the first sample. Probe 3 then discharges into size $c$ vessel No. 1L along with a measured quantity of diluent and possibly another reagent. Probes 2 and 3 then continue to operate on consecutive samples until all samples have been processed when they are switched out automatically by the programme control unit.

Shortly after sample No. 16 has been processed by probe 1, a pin on the turntable acts on a cam surface fixed to probe arm 1 to bring probe 1 into position above the inner row of vessels. Probes 2 and 3 are moved into position above the inner row after sample No. 16 has passed their operating points.

The take-off system is preset to a given position and the programme control unit set accordingly. Thus just before size $c$ vessel No. 1L comes into position below the take-off probe the programme control unit switches the take-off system into an operative state. When size $c$ vessel No. 1L comes into position, the take-off probe is inserted and the contents taken off to a measuring device. Shortly after size $c$ vessel No. 16L has passed the take-off point, the programme control unit actuates a solenoid which releases a catch and allows a spring to push the take-off system into position above the inner row of vessels.

When the last treated sample has passed the take-off point, the programme control unit switches the whole apparatus to a "stand by" state.

I claim:

1. A liquid sampling device for continuously taking measured samples of blood in succession and diluting them with measured quantities of diluent liquid characterised in that there is provided a liquid sampling device for continuously taking measured samples of liquid in succession and diluting them with measured quantities of diluent liquid, said apparatus comprising a probe, a first syringe, the cylinder of which is permanently connected to the probe solely by a closed conduit, a second syringe the cylinder of which is connected by a second closed conduit to a liquid diluent container, a third closed conduit connecting said second conduit to said first conduit, a two-way valve controlling the flow paths only in said second and third conduits, and pressure actuated devices exterior to said circuits operable to actuate the syringes, said devices and the valve being actuated in timed relation whereby the first syringe is actuated to draw a measured volume of a sample of liquid into the probe and to eject it therefrom and the second syringe ejects a measured volume of diluent direct from the container through the probe behind the ejected liquid sample.

2. A liquid sampling device according to claim 1 characterised in that each syringe is operatively connected to an actuating device and the valve is connected to an actuating device, the actuating devices being connected to a source of power which energises said devices in timed sequence.

3. A liquid sampling device according to claim 1 characterised in that the piston of each syringe and a valve actuating rod or the like are connected to one or more fluid pressure or vacuum actuating devices and means are provided to apply pressure of vacuum respectively to the syringe and the valve in a predetermined sequence.

4. An apparatus for continuously taking measured samples of liquid in succession, diluting them with measured quantities of diluent and presenting the prepared samples at a further use station, characterised in that said apparatus comprises a frame, at least two sampling devices according to claim 1 mounted in the frame, a carrier movably mounted in the frame for supporting liquid specimen receptacles and moving them in succession past operating stations, a first sampling device for extracting a measured sample from each specimen and delivering it with a measured quantity of diluent to a separator which separates it into at least two fractions and delivers one separated fraction to a receptacle on a moving carrier, a second sampling device for extracting a measured quantity of the separated fraction from a receptacle on said carrier and delivering said fraction with a measured quantity of diluent into a receptacle on a moving carrier, and a pick-up device for extracting a quantity of diluted fraction from its receptacle and delivering it to a further use station, the sampling devices, carriers, syringe and pick-up device being operated in timed sequence.

5. An apparatus according to claim 4 characterised in that the carriers comprise two turntables each having a plurality of equispaced receptacle receiving means and located so that as they rotate the receiving means pass the operating stations in succession, the probes being movable into and out of alternate specimen receptacles on the first turntable and delivering into a receptacle which may be a separating device, the second turntable having receptacle receiving means, and the second sampling means extracting a separated fraction from alternate receptacles in said last named means and delivering diluted fraction into the alternate receptacles in said lower turntable.

6. An apparatus according to claim 4 for continuously taking measured samples of liquid in succession, diluting them with measured quantities of diluent and presenting the prepared samples at a further use station, said apparatus comprising a frame characterised in that three sampling devices are provided each having a probe mounted on a fixed tower two operating on the sample containers on the upper turntable and the third operating on the sample containers on the lower turntable, each sampling device cooperating with a diluent metering device actuated by a calibrated syringe, the probe for the lower turntable being moved into and out of operation by a rotary cam acting mechanism actuated by and in timed relation with the upper and lower turntable shaft.

7. A liquid sampling device comprising, in combination,
 a hollow probe having an open distal end adapted to be inserted into a liquid to be sampled,
 a first chamber connected to the proximal end of said probe, said first chamber being of a volumetric capacity less than the volumetric capacity of said probe, whereby drawing liquid to be sampled into said probe by inducting the volume of said first chamber is ineffective to draw the sampled liquid into said first chamber,
 a second chamber,
 a diluent liquid supply,
 means for actuating said first and said second chambers to induct and to expel predetermined amounts of liquid from each, and
 valve means for connecting said second chamber to said diluent liquid supply when said means are operated to induct liquid and to connect said second chamber to said probe when said means are operated to expel liquid, whereby the liquid being sampled is first inducted into said probe by the action of said first chamber and is then expelled therefrom together with a predetermined quantity of diluent liquid by the action of both chambers.

References Cited

UNITED STATES PATENTS

| | | | |
|---|---|---|---|
| 3,012,863 | 12/1961 | Feichtmeir | 23—253 |
| 3,178,266 | 4/1965 | Anthon | 23—259 XR |
| 3,192,968 | 7/1965 | Baruch et al. | 23—259 XR |
| 3,192,969 | 7/1965 | Baruch et al. | 23—259 XR |
| 3,193,359 | 7/1965 | Baruch et al. | 23—259 XR |
| 3,219,416 | 11/1965 | Natelson | 23—259 XR |

MORRIS O. WOLK, Primary Examiner

R. E. SERWIN, Assistant Examiner

U.S. Cl. X.R.

23—259; 137—625.65; 141—23; 222—135, 148, 309; 73—425.6